April 26, 1927.
J. F. O. STRATTON
FLOW METER
Filed Sept. 7, 1920
1,626,216
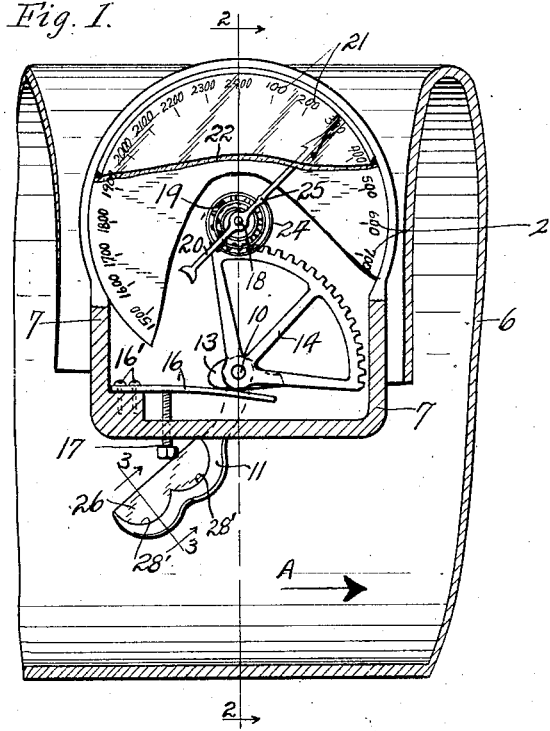
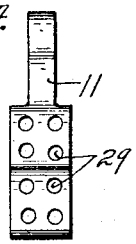
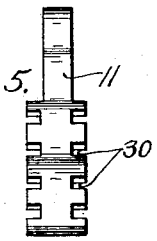
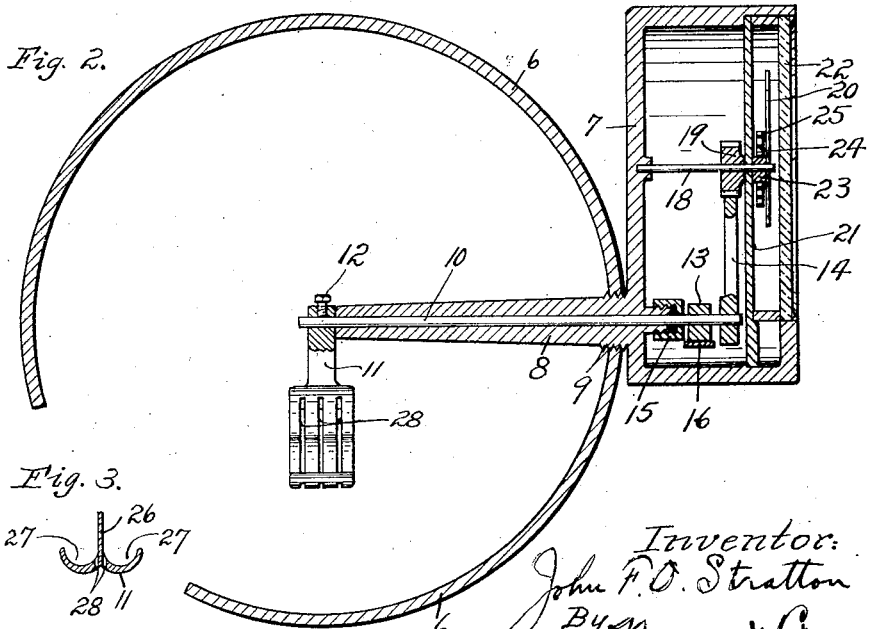
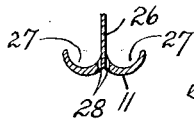

Patented Apr. 26, 1927.

1,626,216

UNITED STATES PATENT OFFICE.

JOHN F. O. STRATTON, OF CHICAGO, ILLINOIS.

FLOW METER.

Application filed September 7, 1920. Serial No. 408,495.

My invention relates to flow meters, and has for one of its objects the provision of a simple and efficient device of the character mentioned.

A further object is the provision of a simple and efficient means for indicating the amount of fluid passing through a conductor by the pressure of the flowing fluid.

Other objects will appear hereinafter.

An embodiment of my invention is illustrated in the accompanying drawing, forming a part of this specification, and in which—

Fig. 1 is a fragmental side view, partially in section and partially in elevation, showing a flow meter embodying my invention.

Figs. 2 and 3 are sections taken on lines 2—2 and 3—3 respectively in Fig. 1, Fig. 2 showing a slightly modified form of arm 11.

Figs. 4 and 5 are elevations showing different forms of vanes or fluid pressure arms used in the construction.

Referring more particularly to the drawing, I have indicated a tubular fluid conductor 6 which may indicate any kind of conductor which it is desired to apply my fluid meter to.

My improved meter comprises a housing 7 having a stem 8 attached thereto. The stem 8 may be formed integrally as shown or attached in any other desired manner. The stem 8 is provided with some form of connecting means for connecting it to the conductor 6. In the present instance I have indicated threads 9 on the stem fitting corresponding threads in the conductor 6.

The stem 8 is indicated as being hollow with a shaft 10 journaled therein. On the end of the shaft 10 disposed in conductor 6 is a vane or fluid pressure arm 11, attached to the shaft in any desirable manner, such as by thumb screw 12.

The other end of shaft 10 extends into housing 7 and has secured thereon a cam 13 and a sector gear 14. I also provide a stuffing box 15, which may be of conventional or any preferred construction to prevent the fluid passing through conductor 6 from passing out into housing 7.

Attached to an inner wall of the housing 7 I provide a spring 16 which has an end portion bearing against cam 13, so that as the fluid moves arm 11 in the direction of arrow A in Fig. 1 the cam 13 will be moved against spring 16. The spring 16 may be of any approved construction and secured in any desirable manner. I have shown it as being a flat spring secured to the housing 7 by means of screws 16'. In some cases it may be desirable to vary the effective strength of spring 16, and in such cases I provide an adjusting means such as screw 17 for applying pressure on said spring.

Also journaled in the housing 7 is a shaft 18 having a pinion 19 fixed thereon. Adjacent to one end of the shaft 18 I have indicated a pointer 20 operable by the shaft 18 and adapted to cooperate with graduation 21 on a suitable part of housing 7. The dial or calibrations is covered by a transparent plate 22 so as to expose the pointer and dial and have them still protected.

In order to provide means for steadying the pointer 20 I have provided a hub 23 fixed on shaft 18 with a hair-spring 24 having its inner end attached to the hub 23 and its outer end attached as at 25 to pointer 20, so that sudden variations in the speed of rotation of shaft 18 will be minimized by the spring 24.

In Figs. 1 and 3 I have indicated the arm 11 as having its flowing fluid engaging side formed with a plurality of curves therein. I have indicated two curves extended transversely and two curves extending longitudinally in said arm, and it will be understood that the number of these curves may be varied as desired. I have also shown a flat blade or fin 26 extending forwardly of said arm, so that should the flowing fluid not strike the arm straight the fin 26 and curves 27 will engage the flowing fluid in such a manner as to exert substantially the same force on the arm as though such fluid engaged the arm straight or in the direction of swing of said arm. The curves 28 indicated in Fig. 1 are adapted to facilitate providing an arm which will have substantially the same fluid engaging surface in all positions of its oscillatory movement. In the form shown the arm 11 is adapted to travel through an arc of not more than fifty degrees, but it will be understood that the length of this arc may be varied as desired.

In Figs. 2 and 3 I have shown the arm 11 as being provided with longitudinally extending slits 28. The arm 11 in Fig. 2 is provided with three slits 28 and the central web 26 is omitted.

In Fig. 4 I have shown circular perforations 29 through arm 11, and in Fig. 5 I have shown laterally extending recesses 30 in the sides of said arm. The purpose of these openings is to provide means for reducing to a minimum the vacuum at the back of said arm. When the device is used in various kinds of fluids these different perforations will be more effective, for instance in air or gases the perforations 29 or the notches 30 will be more effective, and when used in steam and the like the slits 28 will be more effective. However, these different kinds of openings may be varied as desired.

I claim:

1. A vane or fluid pressure arm for flow meters comprising a blade having a plurality of curved surfaces all facing one general direction and openings extending through said vane and opening in said curved surfaces.

2. A vane or fluid pressure arm for flow meters comprising a blade having longitudinally extending slots therein and a fin extending forwardly of and substantially parallel with said slots on said blade.

3. A vane or fluid pressure arm for flow meters comprising a blade having a plurality of curves in its flowing fluid engaging surface.

4. A vane or fluid pressure arm for flow meters comprising a blade having a plurality of curves in its flowing fluid engaging surface and a fin extending forwardly of and between certain of said curved surfaces.

5. A vane or fluid pressure arm for flow meters comprising a blade having a fin extending forwardly of the front side of said blade and a plurality of openings through said blade.

In testimony whereof I have signed my name to this specification on this 2nd day of September, 1920.

JOHN F. O. STRATTON.